(12) United States Patent
Classen et al.

(10) Patent No.: US 6,220,364 B1
(45) Date of Patent: Apr. 24, 2001

(54) SEEDER WITH OUTRIGGER MARKER

(76) Inventors: Alvin T Classen, Classen Manufacturing, Inc., P.O. Box 172, 1403 Pine Industrial Rd., Norfolk, NE (US) 68701; Matt Tkachyk, Box 38, Elm Creek, Manitoba (CA)

( * ) Notice: Subject to any disclaimer, the term of this patent is extended or adjusted under 35 U.S.C. 154(b) by 0 days.

(21) Appl. No.: 09/352,405

(22) Filed: Jul. 14, 1999

(51) Int. Cl.[7] .................................................. A01B 25/00
(52) U.S. Cl. ............................................................ 172/126
(58) Field of Search .................................. 172/126, 127, 172/130, 131, 132

(56) References Cited

U.S. PATENT DOCUMENTS

| | | | |
|---|---|---|---|
| 1,046,559 | * 12/1912 | Cook | 172/132 |
| 4,365,672 | * 12/1982 | Robinson, Jr. et al. | 172/127 |
| 4,583,598 | * 4/1986 | Knels | 172/126 |
| 4,986,367 | * 1/1991 | Kinzenbaw | 172/126 |
| 5,425,427 | * 6/1995 | Haugen | 172/126 |

* cited by examiner

Primary Examiner—Thomas B. Will
Assistant Examiner—Nathan Mammen
(74) Attorney, Agent, or Firm—Sughrue, Mion, Zinn, Macpeak & Seas, PLLC

(57) ABSTRACT

A seeder of the type adapted to be pulled behind a tractor for seeding a field is provided with an extendable and retractable pivoted linkage assembly on each side of the seeder. A marking disk is rotatably mounted on the furthest extremity of the linkage and a hydraulic piston and cylinder assembly is connected between the two links closest to the seeder assembly for extending and retracting the linkage in a horizontal plane. A pair of support plates are secured to the underside of the two bars closest to the seeder assembly for engaging and supporting the other bars in the retracted condition. Another piston and cylinder assembly is mounted on the seeder and operatively engaged with a lever connected to one of said bars of said first pair of bars for pivoting the retracted linkage upwardly to provide clearance between the marking disk and the field.

3 Claims, 7 Drawing Sheets

SEEDER WITH OUTRIGGER MARKER

BACKGROUND OF THE INVENTION

The present invention is directed to a seeder of the type adapted to be pulled behind a tractor to seed a large field and more specifically to a seeder having an extendable and retractable marker assembly mounted on each side of the seeder with lifting means for raising the marker assembly in the retracted condition clear of the ground.

Heretofore, it has been proposed to provide an agricultural planter or seeder assembly with a marker on each side thereof as disclosed in U.S. Pat. No. 4,365,672. Each marker includes two arms pivotally connected to each other at one end thereof with the other end of one arm being pivotally connected to the planter assembly and the other end of the other arm having a marking disk mounted thereon. A piston and cylinder mechanism is connected to the one arm for causing raising and lowering of the one arm thereby to cause retraction or extension of the marker. Typically, a hydraulic valve assembly is mounted in the cabin of the tractor to which the planter assembly is mechanically and hydraulically coupled with the valve assembly being connected to the piston and cylinder mechanisms associated with each of the markers. Actuation of the valve assembly will cause pressurized hydraulic fluid to be applied to or relieved from the respective piston and cylinder mechanisms. In this way, actuation of the valve assembly will cause retraction of one marker and extension of the other marker.

The disk serves to make a mark a track that a tractor wheel should follow on a return planting sweep of the planter assembly for planting properly spaced adjacent rows after the planter assembly has made a first sweep to plant a first group of rows. Thus, after the planter assembly has made a first planting sweep to plant a plurality of rows and the planters of the assembly are raised and the tractor is turned 180 degrees, the operator of the tractor will actuate the valve assembly to cause the extended marker to be retracted and the retracted marker to be extended. The operator will then align the tractor so that one of the tractor wheels will follow the track made by the extended marker on the first planting sweep. Also, as the second planting sweep is being made, the extended marker will make a track which the tractor wheel will follow on the succeeding planting sweep. After the planting sweep is completed, the planters are raised and the tractor is turned 180 degrees. The sequence will be repeated until the planting is finished.

It was also known in U.S. Pat. No. 1,046,559 to provide a marking disk on the end of a lazy tong assembly with the opposite end of the lazy tong assembly being mounted on a swingable bar pivotally mounted adjacent the center of the end a planter whereby the lazy tong assembly and marking disk may be swung from one side of the planter to the other. A manually operated lever was provided for extending and retracting the marking disk.

SUMMARY OF THE INVENTION

The present invention is directed to a new and improved seeder having a lazy tong assembly mounted on each side of the seeder for extending and retracting a rotatable marking disk relative to the seeder. Each lazy tong assembly is extended and retracted by a piston and cylinder assembly. Upon retraction of the lazy tong assembly into overlying relation relative to pivoted support means, the pivoted support means can be rotated by a further piston and cylinder assembly to raise the retracted lazy tong assembly upwardly to provide sufficient ground clearance.

The specific nature of the invention, as well as advantages thereof will clearly appear from the following description and from the accompanying drawings.

BRIEF DESCRIPTION OF THE DRAWING FIGURES

DETAILED DESCRIPTION OF THE INVENTION

Figure 1:
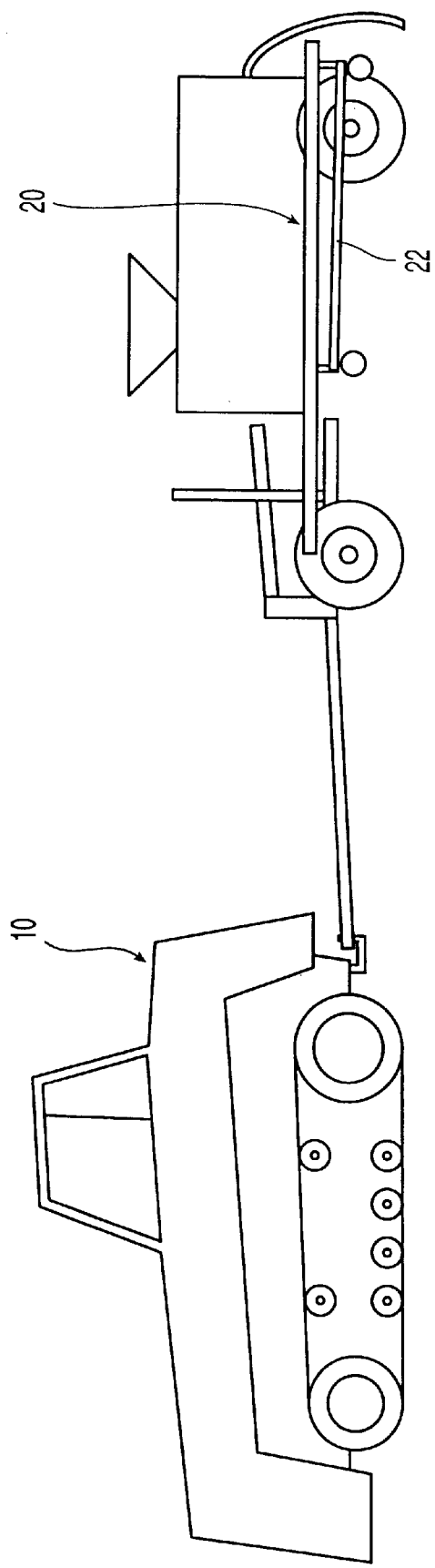
FIG. 1 is a side elevational view of a tractor connected to a seeder trailer with the actual seed planting means being eliminated for the sake of clarity.

FIG. 1 shows a representative tractor 10 pulling a trailer 20 upon which a suitable seeding mechanism would be mounted for planting a field. A seeder has not been shown in detail since the seeder per se does not form any part of the invention. A marker assembly 22 is schematically shown in FIG. 1 for marking a furrow in the field parallel to the path the tractor traverses across the field. The purpose of the marker mechanism is to enable the tractor to follow the furrow on the traverse of the field in the opposite direction so that the two seeded swaths with accurately abut each other.

Figure 2:
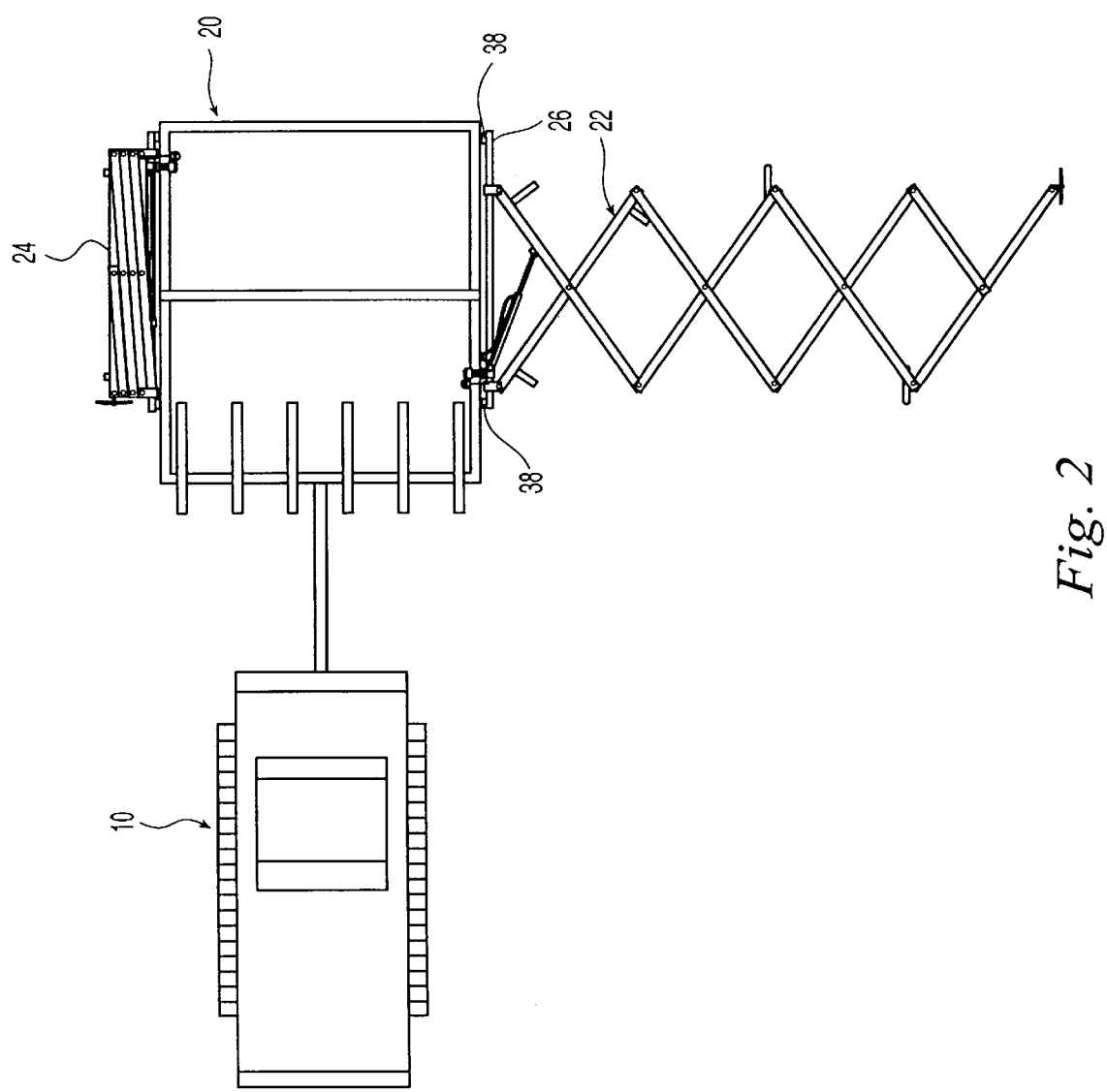
FIG. 2 is a top plan view of the tractor and seeder trailer with the marker assembly on one side of the trailer extended and the marker assembly on the opposite side of the trailer retracted.
Figure 3:
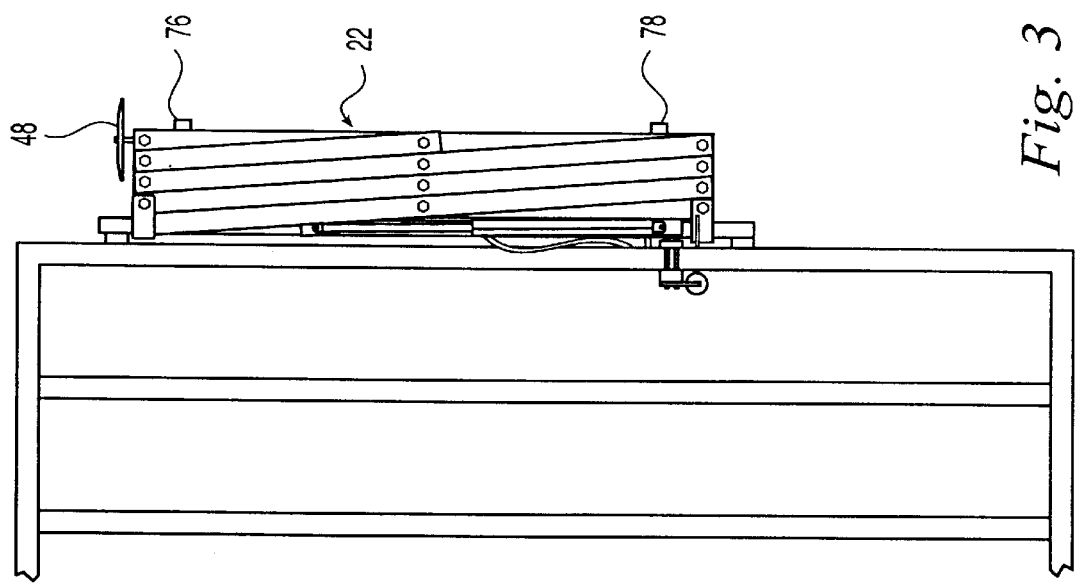
FIG. 3 is an enlarged top plan view of a marker assembly in the retracted position.
Figure 6:
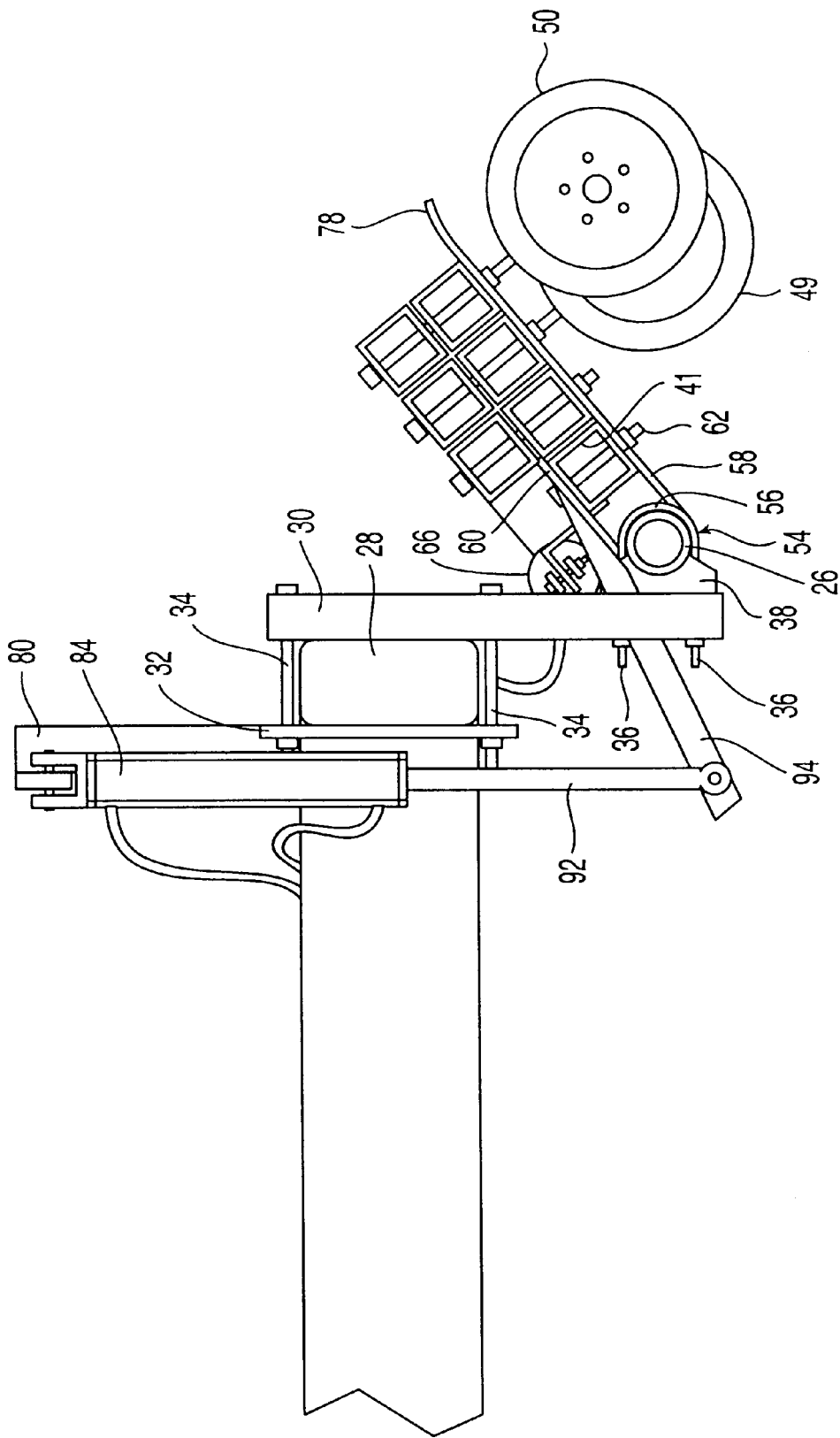
FIG. 6 is a side elevational view of the tilting mechanism for the marker assembly in the raised condition.
Figure 7:
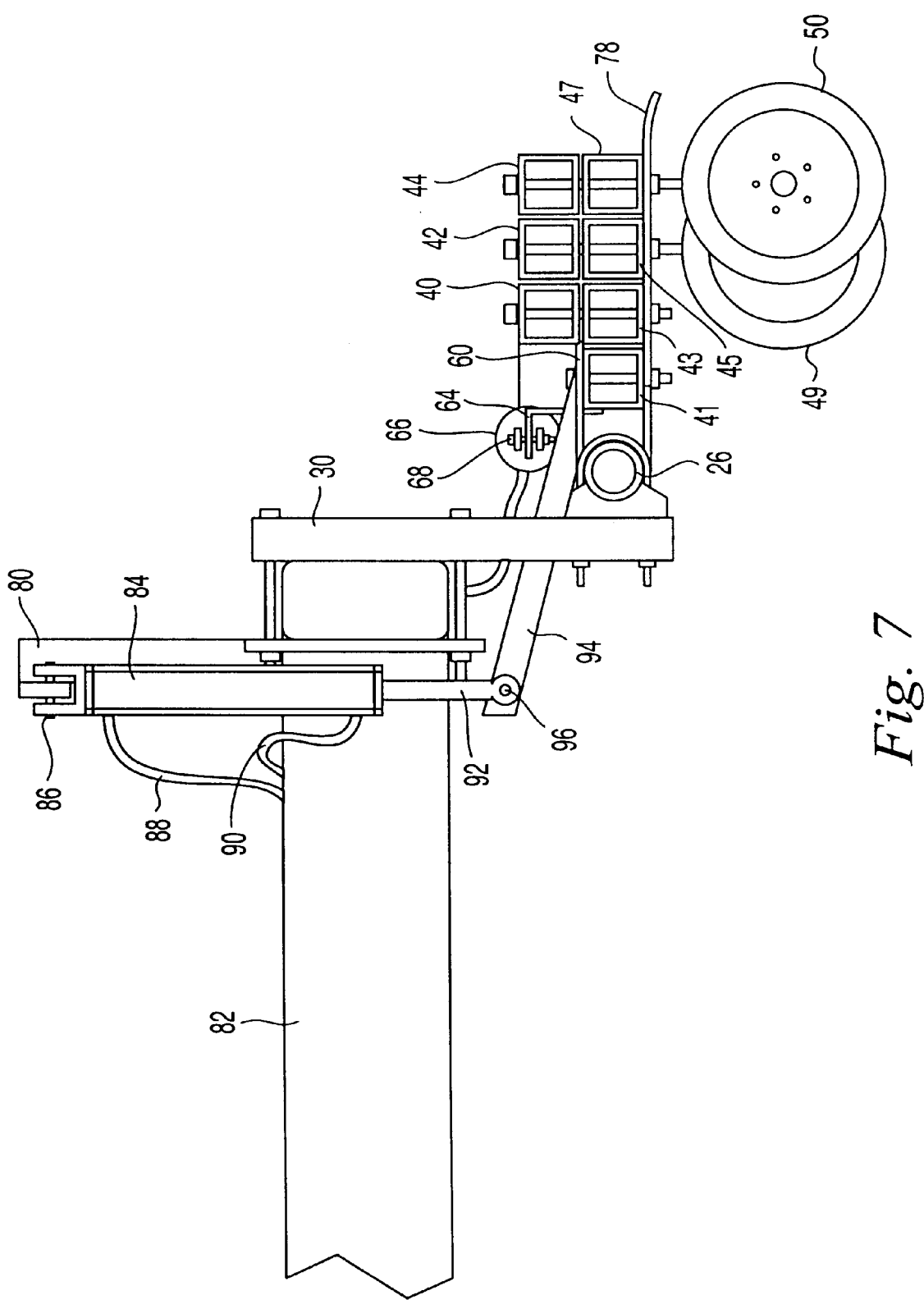
FIG. 7 is a side elevational view of the tilting mechanism for the marker assembly in the lowered condition.

As best seen in FIG. 2, the marker arm 22 is comprised of a series of jointed and pivoted bars capable of great extension in the form of a lazy tong. A support tube 26 is rigidly mounted on the side frame member 28 of the seeder by means of a pair of vertically depending support plates 30, one of which is shown in FIGS. 6 and 7. The plate 30 is clamped to the side frame member 28 by means of a clamping plate 32 connected to each plate 30 by means of nut and bolt assemblies 34. The tube 26 is secured to the lower end of the plate 30 by means of brackets 38 and U-shaped bolt and nut assemblies 36.

Figure 5:
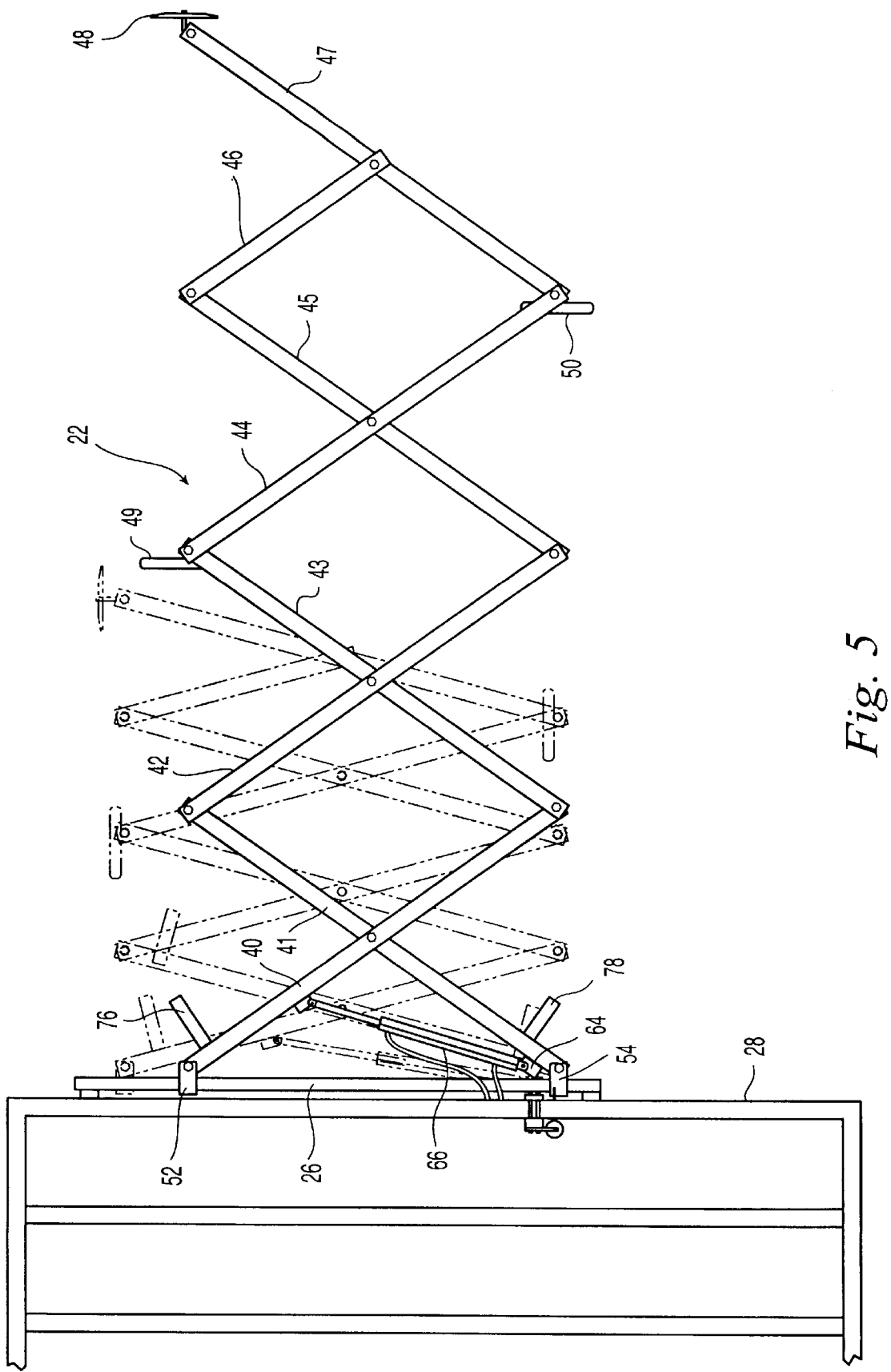
FIG. 5 is a top plan view of a marker assembly in the fully extended position.

The extendable and retractable lazy tong assembly 22 is comprised of a plurality of pairs of tubular metal bars 40–41, 42–43, 44–45 and 46–47 pivotally connected to each other at their mid points with the ends of each pair being pivotally connected to the ends of an adjacent pair. Each of the bars has a square cross-section. In the outermost pair, the bar 46 terminates at the mid point of the bar 47 and a rotatable disk 48 is rotatably mounted at the outermost end of the bar 47. The disk 48 has a concave/convex curvature similar to a typical harrow disk. Support wheels 49 and 50 are rotatably mounted at opposite ends of the bar 44 to provide support for the middle portion of the lazy tong assembly to prevent sagging of the lazy tong assembly when it is in the extended condition as shown in FIG. 5.

The ends of the bars 40 and 41 adjacent the tubular bar 26 are pivotally connected to support brackets 52 and 54. Each support bracket 52, 54 is comprised of a hollow tubular sleeve 56 which is partially shown in FIG. 6 and a pair of tangential flanges 58 and 60 which are welded thereto. Each tubular sleeve 56 has an internal diameter slightly greater than the external diameter of the tubular bar 26 so that the sleeve 56 is rotatable and slidable on the tubular bar 26. As shown in FIGS. 6 and 7, the innermost end of the bar 41 is disposed between the two tangential flanges 58 and 60 of the support bracket 54 and is pivotally connected thereto by means of a nut and bolt assembly 62. The construction of the bracket 52 and the manner in which the innermost end of the bar 40 is connected thereto is identical to the construction shown in FIGS. 6 and 7 with respect to the bracket 54.

An L-shaped bracket 64 is mounted on the side of the bar 41 adjacent the support bracket 54. One end of a hydraulic cylinder 66 is pivotally mounted to the L-shaped flange 64 by means of a nut and bolt assembly 68, as best seen in FIGS. 6 and 7. A piston, not shown, reciprocates within the cylinder 66 and a piston rod 69 extends outwardly of the cylinder 66 with the free end thereof pivotally connected to a bracket 70 mounted on the bar 40. Hydraulic hoses 72 and 74 are connected to opposite ends of the cylinder 66 and are also connected to a suitable source of hydraulic pressure (not shown) associated with the tractor 10.

Figure 4:
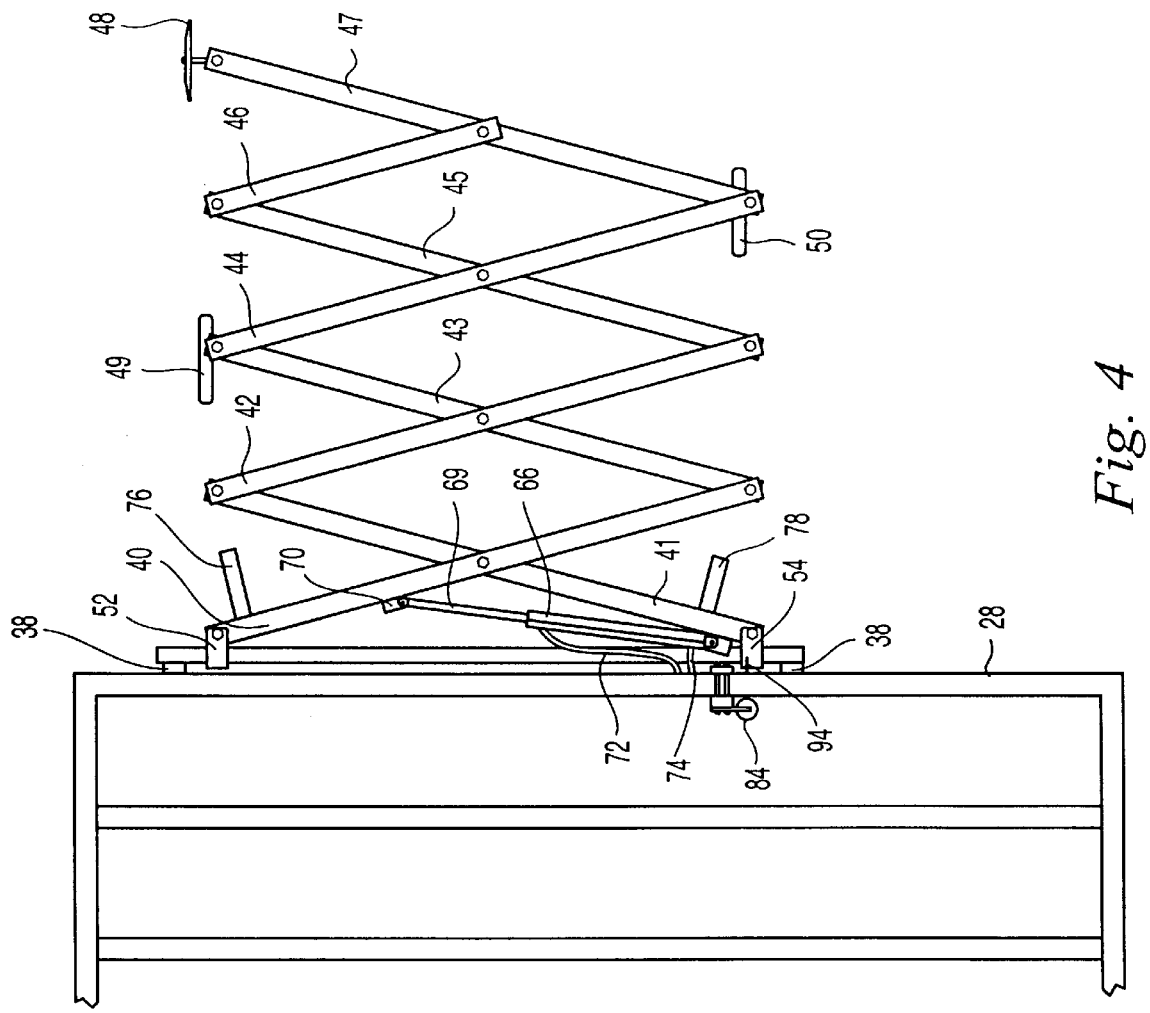
FIG. 4 is an enlarged top plan view of a marker assembly in a partially extended position.

Upon the application of pressurized hydraulic fluid through the hose 74 to the cylinder 66, the piston rod 69 will be extended to expand the lazy tong linkage 22 from the retracted position shown in FIGS. 6 and 7 to the extended positions shown in FIG. 4. In the retracted position, the wheels 49 and 50 as well as the disk 48, extend substantially perpendicular to the side frame member 28 of the trailer carrying the seeder. As the lazy tong mechanism 22 reaches its fully extended position, the wheels 49 and 50, as well as the disk 48, will extend substantially parallel to the frame member 28 of the trailer. It is preferable that the plane of the disk 48 be slightly angled relative to the direction of travel so as to create a more visible furrow in the field which will be easier for the tractor driver to follow on the subsequent traverse of the field.

A pair of flat support members 76 and 78 are welded to the under sides of the bars 40 and 41 in spaced relation to the support brackets 52 and 54. Upon the application of pressurized fluid to the cylinder 66 through the hose 72, the piston rod 69 will be retracted, thereby folding the lazy tong assembly into the condition shown in FIGS. 6 and 7. The support member 78, as shown in FIGS. 6 and 7, is disposed in underlying supporting relation to the folded lazy tong assembly 22. The outermost end of the support member 78 may be bent slightly downwardly to facilitate the sliding movement of the bars of the lazy tong mechanism as they move into overlying relation with the support members 76 and 78. The support member 76 is provided with a similar downward curvature. Thus, the folded lazy tong assembly will be supported on the projecting support members 76 and 78.

An upstanding support post 80 is secured to the frame 82 of the trailer by any suitable means such as welding or clamping brackets similar to that used for securing the plate 30 to the frame member 28. A hydraulic cylinder 84 is pivotally supported at its upper end to the upper end of the post 80 by means of a pivot connection 86. Hoses 88 and 90 are connected to opposite ends of the cylinder 84 for supplying pressurized hydraulic fluid thereto for the purpose of reciprocating a piston (not shown) within the cylinder. A piston rod 92 connected to the piston extends outwardly of the cylinder 84 with the free end thereof pivotally connected to one end of a lift bar 94 by means of the pivotal connection 96. The opposite end of the lift bar 94 is welded to the tangential flange 60 on the opposite side of the tubular bar 26. Upon extension of the piston rod 92, the left end of the lift bar 94, as shown in FIGS. 6 and 7, will move downwardly from the position shown in FIG. 7 to the position shown in FIG. 6. The entire bracket 54, which is rotatably mounted on the tubular bar 26, will rotate about the tubular bar 26 to move the support bracket from the position shown in FIG. 7 to the position shown in FIG. 6 to elevate the folded lazy tong assembly. Thus, the wheels 49 and 50 and the disk 48 will be lifted clear of the ground and will not interfere with the movement of the trailer over the ground. Actuation of the piston rod 92 in the opposite direction will lower the lazy tong assembly 22 while concurrent operation of the piston and cylinder arrangement 69 and 66 will extend the lazy tong assembly to its operative extended position as shown in FIG. 5.

The frame of the trailer, as well as the bars of the lazy tong assembly, may be made of high strength steel. The tangential flanges of the support brackets 52 and 54 are preferably welded to the tubular sleeve of the bracket. Likewise, the support bars 76 and 78 are of high strength steel and are preferably welded to the bars 40 and 41. The bars of the lazy tong mechanism are preferably hollow tubular bars with a substantially square cross-section. While the marker member is preferably a harrow-type disk, various other types of marker devices could be substituted therefor. The support wheels for the lazy tong mechanism may be of any suitable type.

While the preferred embodiments have been described, variations thereto will occur to those skilled in the art within the scope of the present inventive concepts which are delineated by the following claims.

What is claimed is:

1. A seeder assembly adapted to be mechanically and hydraulically coupled to a tractor and which has hydraulically actuated, first and second, extendible marker assemblies mounted on opposite sides of the seeder assembly for marking, respectively, the track that a tractor should follow on a return seeder sweep, each marker assembly comprising:

a plurality of pairs of pivotally interconnected bars forming an extendable and retractable lazy tong assembly;

a support pivotally connected to each bar of a first pair of said bars adjacent a side of said seeder assembly for pivotally and slidably mounting said first pair of bars on said seeder assembly;

a first hydraulic mechanism connected between said bars of said first pair for extending and retracting said lazy tong assembly;

a marker disk rotatably mounted on a free end of a bar furthest from said seeder assembly for making a furrow in a field parallel to a respective side of said seeder assembly; and a lifting mechanism that supports said bars in a retracted condition and pivots the retracted bars upwardly relative to said seeder assembly to raise said marking disk out of contact with said field.

2. A seeder assembly as set forth in claim 1, wherein said lifting mechanism comprises:

a horizontally extending plate secured to each bar of said first pair of bars and extending outwardly from said seeder assembly for engaging and supporting all of the bars in the retracted conditions; and a second hydraulic mechanism mounted on said seeder assembly in operative engagement with an actuator plate connected to and extending from one of said supports.

3. A seeder assembly as set forth in claim 1, further comprising support wheels rotatably mounted on selected bars between said supports and said marking disk to maintain the lazy tong assembly in a substantially horizontal planar condition.

\* \* \* \* \*